Oct. 6, 1936. H. NUTT ET AL 2,056,203
FRICTION CLUTCH
Filed Dec. 2, 1932
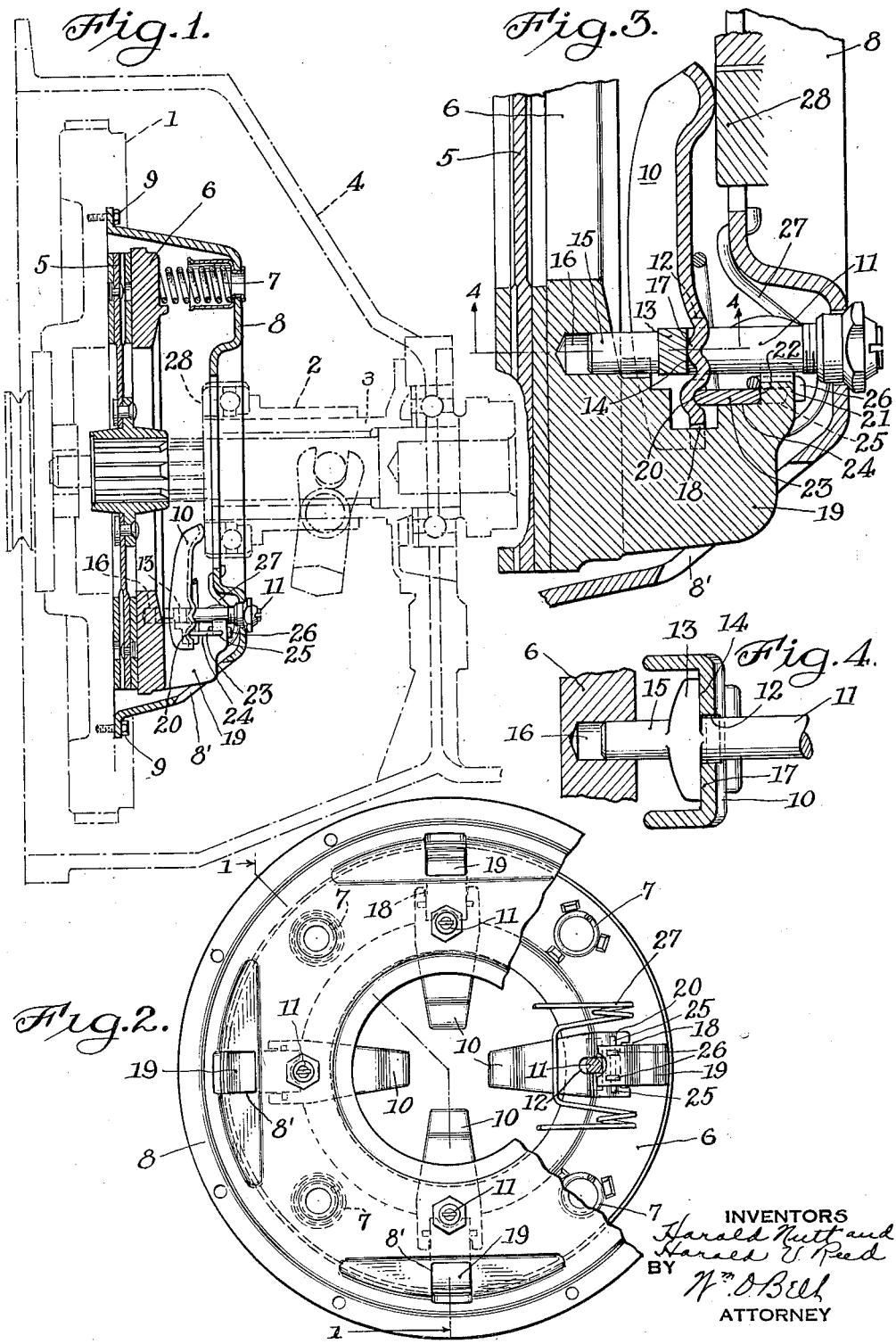

Patented Oct. 6, 1936

2,056,203

UNITED STATES PATENT OFFICE 2,056,203

FRICTION CLUTCH

Harold Nutt and Harold V. Reed, Chicago, Ill., assignors, by mesne assignments, to Borg-Warner Corporation, Chicago, Ill., a corporation of Illinois Application December 2, 1932, Serial No. 645,393

12 Claims. (Cl. 192—68)

This invention relates to friction clutches and it is particularly useful in that type of clutch which is employed in connection with the power plant of an automotive vehicle. Modern traffic, traveling and other conditions require that the clutch of an automotive vehicle should be operated more frequently than has been the practice in the past and this condition has naturally resulted in an increase of wear on the rubbing parts of the clutch which, in turn, has resulted in an increase of friction between the rubbing parts to such an extent that the force required to release the clutch is appreciably greater than formerly.

This application embraces certain improvements over the subject matter of our copending application Serial No. 645,392.

The primary object of this invention is to improve the action and thereby increase the efficiency of a friction clutch by reducing the friction between its moving parts.

And a further object of the invention is to provide a simple and novel arrangement of parts whereby rolling contact between the clutch levers and their supports and between the clutch levers and the pressure ring is substituted for a rubbing action and the friction between said parts is reduced to a minimum.

We have illustrated a selected embodiment of the invention in the accompanying drawing in which Fig. 1 is a vertical sectional view on the line 1—1 of Fig. 2 showing a clutch embodying the invention, the housing and some other parts being shown in broken lines.

Fig. 2 is an elevation of the clutch shown in Fig. 1, partly broken away and in section.

Fig. 3 is an enlarged detail sectional view showing one of the lever units of the clutch.

Fig. 4 is a detail sectional view on the line 4—4 of Fig. 3.

Referring to the drawing, 1 is a flywheel rigidly mounted on a driving shaft (not shown) and 2 is a clutch release device operating on a sleeve 3 and within a housing 4. A clutch plate 5 is rigidly mounted on the driven shaft and is clamped by a pressure plate or ring 6 and springs 7 against the flywheel 1 whereby to impart motion from the driving shaft and flywheel through the clutch plate to the driven shaft. A cover 8 is fastened to the flywheel by bolts 9 and clutch levers 10 are pivotally mounted on T-bolts 11 which are supported in the cover and are adapted to be operated by the clutch release 2 to retract the pressure plate against the tension of the springs 7 and release the clutch. The invention may be used with clutch plates of different kinds and any suitable number of lever units may be provided.

Each lever 10 has an opening 12 to receive the T-bolt 11 and the cross member 13 of the T-bolt has a flat contact face 14 which forms a rolling bearing for the lever. This T-bolt may be supported and secured wholly in the cover 8 of the clutch but we prefer to provide it with a tail 15 to operate in a socket 16 in the pressure plate for preventing lateral movement of the T-bolt. The lever is provided with a crown 17 to contact the flat face 14 of the cross member of the T-bolt, which constitutes its bearing, whereby the lever will oscillate with a rolling action on its bearing.

The outer end of the clutch lever is recessed at 18 to receive a boss 19 on the pressure plate and between this recess and the crown 17 the lever is provided with a socket 20 on the side thereof opposite the crown 17. The boss is provided with an inwardly extending lug 21 having a flat face 22 and a strut 23 in the form of a comparatively thin plate has one edge rounded and engaging the flat face 22 and its opposite edge rounded and engaging the socket 20. The strut, being interposed between the lever and the pressure ring, transmits movement between these parts and the rounded contact surfaces of the strut, with the lever and the pressure ring, insure a rolling contact between the strut and the pressure ring and a combination rolling and sliding contact between the strut and the lever which greatly reduces the friction. The strut 23 abuts a shoulder 24 on the boss 19 and it is provided with end projections 25 which embrace the lug 21. A retaining wire 26 extends through the lug 21 and engages the strut 23. The boss 19 projects through an opening 8' in the cover so that the pressure ring and the cover will revolve together and there will be a tendency for the lever to work outwardly by centrifugal force and engage the bottom of the recess in the outer end of the lever with the boss but this is prevented by the abutment formed by the shoulder 24 on the boss with which the strut engages and by the lock wire 26 which retains the strut in position. Springs 27 engage the cover and the clutch levers to prevent the levers from rattling or chattering.

When the clutch release bearing 28 is operated, to the left in Figs. 1 and 3, by the clutch release device to release the clutch, the clutch levers will oscillate with a rolling action on their bearings in the T-bolts and at the same time the struts will swing inwardly slightly on their bearings against the lugs. The edge of the strut which engages the lug is rounded and the contact face of the lug is flat, and the edge of the strut which engages the lever is rounded and the contact face of the lever in the socket 20 is also rounded but on an arc of longer radius than the rounded edge of the strut so that the movement of the strut at its pressure ring contact edge is with a rolling action on its bearing and the movement of the strut at its lever contact edge is with a rolling action combined with a sliding action on its bearing. The wires 26 hold the struts against the abutment shoulders 24 on the bosses to prevent outward bodily movement of the levers under centrifugal action when the clutch is rotating with the flywheel but the clearance therebetween is sufficient to permit swinging movement of the struts when the levers are oscillated by the clutch release devices. The clutch levers pivot on their bearings provided by the cross members 13 on the supporting bolts 11 with a rolling action and the movement of the struts where they contact with the pressure ring is with a rolling action and where they contact with the clutch levers is with a combination rolling and sliding action so that the levers operate with a minimum of friction and without appreciable wear.

We have shown and described the invention in one form and in one type of automotive clutch but it may be embodied in other forms and in other types of clutches and we reserve the right to make all such changes and modifications as may be necessary or desirable for these purposes, within the scope of the following claims.

We claim:

1. A friction clutch comprising, a pressure ring, a lever for operating said ring, a support for the lever, said lever having an opening therethrough intermediate its length and said support extending through said opening and presenting on the remote side of said lever a flat surface, and a fixed projection on the lever engaging said flat surface and forming a pivot for the lever thereby to provide a rolling action of the pivot on the support during movement of the lever.

2. A friction clutch comprising, a pressure ring, a lever for operating said ring, a support for the lever, said lever having an opening therethrough intermediate its length and said support extending through said opening and presenting on the remote side of said lever a flat surface, and a projection on said lever presenting a cylindrical crown surface engageable with said support and forming a pivot for the lever thereby to provide a rolling action of the pivot on the support during movement of the lever.

3. A friction clutch comprising, a pressure ring, a lever for operating said ring, and a support for the lever, said lever having an opening therethrough intermediate its length and said support extending through said opening to clear the side walls of the opening, said support having a cross member on the remote side of the lever presenting a lever contacting surface, the contacting surfaces between said cross member and said lever comprising cooperating crowned and flat surfaces, whereby the lever may pivot upon the support arm with a rolling action during oscillation of the lever.

4. A friction clutch comprising a pressure ring, a lever for operating the ring, a T-bolt support for the lever, a flat contact face on the support and an integral crown on the lever contacting said flat face whereby the lever will pivot on the support with a rolling action in the movement of the lever.

5. A friction clutch comprising a pressure ring, a lever for operating the ring, a support for the lever, and means including an abutment on the pressure ring to prevent bodily outward movement of the lever into engagement with the pressure ring.

6. A friction clutch comprising a pressure ring, a lever for operating the ring, a support for the lever, a movable strut interposed between the lever and the pressure ring for imparting movement from one to the other, and an abutment on the pressure ring for said strut to prevent bodily outward movement of the lever into engagement with the pressure ring.

7. A friction clutch comprising a pressure ring, a lever for operating the ring, a support for the lever, a movable strut interposed between the lever and the pressure ring for imparting movement from one to the other, an abutment on the pressure ring for said strut to prevent bodily outward movement of the lever into engagement with the pressure ring, and means engaging said strut for retaining it in operative position.

8. A friction clutch comprising a pressure ring, a lever for operating the ring, a support for the lever, a movable strut interposed between the lever and the pressure ring for imparting movement from one to the other, an abutment on the pressure ring for said strut to prevent bodily outward movement of the lever into engagement with the pressure ring, and a lock wire on the pressure ring engaging said strut and retaining it in operative position.

9. A friction clutch comprising a pressure ring, a lever for operating the ring, a support for the lever, a boss on the pressure ring, a lug on the boss, an abutment on the boss, a movable strut interposed between the lever and the lug for imparting movement from one to the other, and means retaining the strut in position to engage the abutment and prevent bodily outward movement of the lever into engagement with the pressure ring.

10. A friction clutch comprising a pressure ring, a lever for operating the ring, a support for the lever, a socket on the lever, a movable strut engaging said socket and said pressure ring, and means on the pressure ring for limiting the movement of the strut.

11. A friction clutch comprising a pressure ring, a lever for operating the ring, a support for the lever, a socket on the lever, a movable strut engaging said socket and said pressure ring, and an abutment on the pressure ring forming a stop for the strut and limiting bodily outward movement of the lever.

12. A friction clutch comprising a pressure ring, a lever for operating the ring, a support for the lever, a projection on the lever engaging said support and forming a pivot for the lever, means providing a rolling action of the pivot on the support in the movement of the lever, a movable strut interposed between the lever and the pressure ring for imparting movement from one to the other, and an abutment on the pressure ring for the strut to limit bodily outward movement of the lever.

HAROLD NUTT.
HAROLD V. REED.